(12) United States Patent
Zaccone et al.

(10) Patent No.: US 10,321,192 B2
(45) Date of Patent: Jun. 11, 2019

(54) SYSTEM AND METHODS OF COMMUNICATING BETWEEN MULTIPLE GEOGRAPHICALLY REMOTE SITES TO ENABLE A SHARED, SOCIAL VIEWING EXPERIENCE

(71) Applicant: TOK.tv Inc., Redwood City, CA (US)

(72) Inventors: Emanuela Zaccone, Rome (IT); Fabrizio Capobianco, Redwood City, CA (US)

(73) Assignee: TOK.tv Inc., San Francisco, CA (US)

( * ) Notice: Subject to any disclaimer, the term of this patent is extended or adjusted under 35 U.S.C. 154(b) by 19 days.

(21) Appl. No.: 13/857,995

(22) Filed: Apr. 6, 2013

(65) Prior Publication Data

US 2016/0192010 A1 Jun. 30, 2016
US 2017/0150223 A9 May 25, 2017

Related U.S. Application Data

(60) Provisional application No. 61/621,462, filed on Apr. 6, 2012, provisional application No. 61/621,464, filed on Apr. 6, 2012.

(51) Int. Cl.
*H04N 21/21* (2011.01)
*H04N 21/41* (2011.01)
*H04N 21/81* (2011.01)
*H04N 21/258* (2011.01)
*H04N 21/4788* (2011.01)

(52) U.S. Cl.
CPC ......... *H04N 21/4788* (2013.01); *H04N 21/21* (2013.01); *H04N 21/258* (2013.01); *H04N 21/4126* (2013.01); *H04N 21/8166* (2013.01)

(58) Field of Classification Search
CPC . H04N 21/4788; H04N 21/21; H04N 21/8166
USPC .......................................................... 725/116
See application file for complete search history.

(56) References Cited

U.S. PATENT DOCUMENTS

| 8,869,222 | B2 * | 10/2014 | Winograd | H04N 5/44 |
| | | | | 725/110 |
| 9,510,044 | B1 * | 11/2016 | Pereira | H04N 21/44008 |
| 2005/0149988 | A1 | 7/2005 | Grannan | |
| 2006/0156375 | A1 | 7/2006 | Konetski | |
| 2006/0236352 | A1 * | 10/2006 | Scott, III | H04N 5/76 |
| | | | | 725/89 |
| 2006/0244818 | A1 | 11/2006 | Majors et al. | |
| 2008/0177557 | A1 | 7/2008 | Saul | |

(Continued)

FOREIGN PATENT DOCUMENTS

| WO | WO2013029263 A1 | 3/2013 |
| WO | WO2013079993 A1 | 6/2013 |
| WO | WO2013144681 A1 | 10/2013 |

*Primary Examiner* — Alfonso Castro
(74) *Attorney, Agent, or Firm* — Carr & Ferrell LLP

(57) ABSTRACT

A system providing for selective management of program display system services involving display devices located at geographically remote locations relative to one another. The system includes a display device, located at each of a plurality of sites, that is capable of receiving and displaying a transmitted show. A control device, also located at each of the plurality of sites, enables managed control of the display device through the execution of a client application. A cloud service interacts with the client applications as executed by the control devices to manage select associations of the plurality of sites.

10 Claims, 1 Drawing Sheet

(56) References Cited

U.S. PATENT DOCUMENTS

| | | | |
|---|---|---|---|
| 2010/0083324 A1* | 4/2010 | Smith | H04N 7/17318 725/109 |
| 2010/0119208 A1* | 5/2010 | Davis | H04N 5/765 386/291 |
| 2010/0235466 A1 | 9/2010 | Jung et al. | |
| 2011/0063503 A1* | 3/2011 | Brand | H04N 5/4401 348/500 |
| 2011/0099616 A1* | 4/2011 | Mazur | H04L 63/0846 726/7 |
| 2011/0246908 A1* | 10/2011 | Akram | H04N 21/23431 715/752 |
| 2011/0247031 A1* | 10/2011 | Jacoby | H04N 21/4351 725/25 |
| 2011/0283203 A1* | 11/2011 | Periyannan | H04N 7/141 715/753 |
| 2012/0098920 A1* | 4/2012 | Pennington | H04N 7/148 348/14.03 |
| 2012/0159348 A1 | 6/2012 | Stroomer et al. | |
| 2012/0210379 A1* | 8/2012 | McCoy | H04N 21/25808 725/109 |
| 2012/0331476 A1 | 12/2012 | Saffre | |
| 2013/0076980 A1* | 3/2013 | Oren | H04N 5/04 348/500 |
| 2013/0091284 A1* | 4/2013 | Rothschild | G06F 3/067 709/226 |
| 2013/0173710 A1* | 7/2013 | Seo | H04L 67/12 709/204 |
| 2013/0222638 A1 | 8/2013 | Wheeler et al. | |
| 2013/0251329 A1* | 9/2013 | McCoy | H04N 21/654 386/201 |
| 2013/0290502 A1* | 10/2013 | Bilobrov | G06F 21/10 709/223 |
| 2013/0308818 A1* | 11/2013 | MacIntosh | G06T 1/0021 382/100 |
| 2014/0071344 A1* | 3/2014 | Francisco | H04N 21/242 348/500 |
| 2014/0189042 A1 | 7/2014 | Chen et al. | |
| 2015/0089051 A1* | 3/2015 | Ojanpera | H04S 3/004 709/224 |
| 2015/0146874 A1* | 5/2015 | Ojanpera | H04R 29/00 381/56 |
| 2016/0249081 A1 | 8/2016 | Capobianco | |
| 2017/0257652 A1 | 9/2017 | Capobianco et al. | |

* cited by examiner

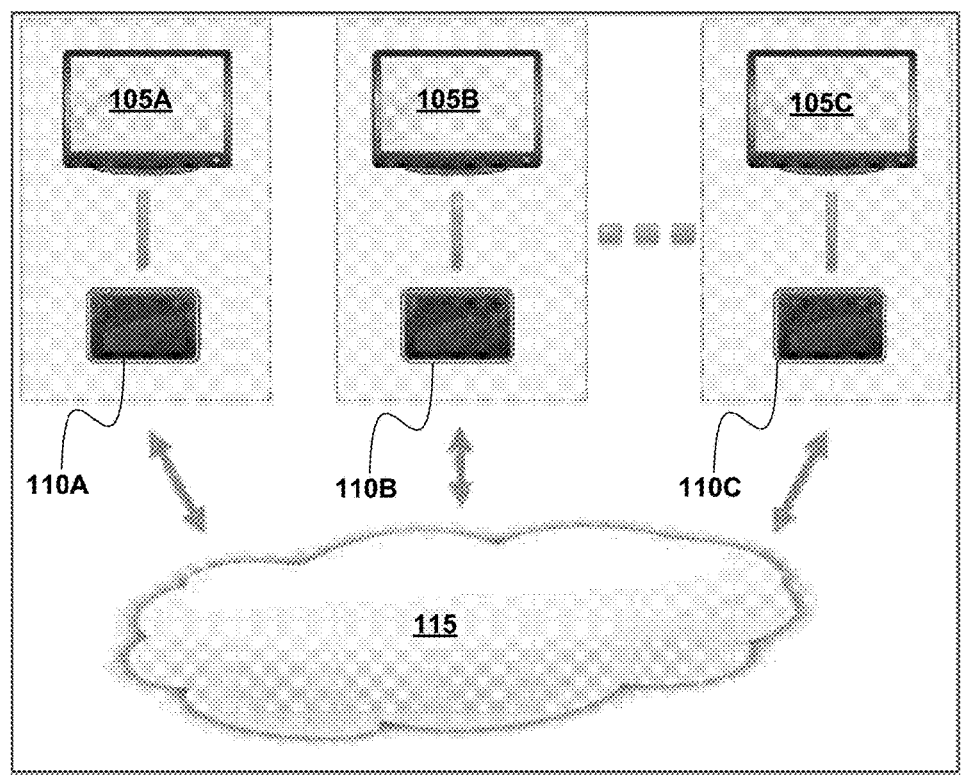

SYSTEM AND METHODS OF COMMUNICATING BETWEEN MULTIPLE GEOGRAPHICALLY REMOTE SITES TO ENABLE A SHARED, SOCIAL VIEWING EXPERIENCE

This application claims the benefit of U.S. Provisional Application Nos. 61/621,462 and 61/621,464, all filed Apr. 6, 2012.

BACKGROUND OF THE INVENTION

Field of the Invention

The present invention is generally related to the remote distribution and playback of television programs and, in particular, to mechanisms for enabling a shared, social viewing experience between sites that are geographically remote from one another.

Description of the Related Art

The world of television is about to change. For 70 years, the television box has been completely disconnected from the rest of the household. With the advent of wireless networks, connected set-top-box and tablets, our old television is now about to be integrated in our daily life.

For example, we can watch a movie and check information about that actor on an iPad sitting on our laps. The so-called "second screen" can augment the vision of the show we are watching, allowing us to enjoy it even more.

Watching a show on television with an iPad connected to the world allows for a completely new scenario, where television can become (or return to being) social. We all get together for a great game, to watch it with friends in front of the television. However, in most cases we are unable or unwilling to travel, but we still would love to chat about a show with our friends, live, while the show is on television. With the support of a second-screen device, this is finally possible: we can communicate with all the people watching the same show we are watching, just because they have an iPad on their laps too.

The opportunity is incredible, because making television social means changing the way we watch television. Once you give a user this capability, there is no turning back. There is nothing more depressing than watching television alone. Once you are able to share the experience with friends—even if they are far away—you will never go back: watching television alone is going to be a thing of the past.

This scenario opens up a new opportunity for advertisers, who are investing $200B every year to show commercials on a box, without knowing if the consumer is actually watching the show, or what she likes, or giving her any ability to interact with the ad. With a second screen, the advertiser will be able to target the user and deliver ads that become interactive, not on the television, but on the second screen: I see a commercial about a tennis shoe on television, and I have the ability to buy it on the tablet. This is the holy grail of advertising.

As of today, a few players in the market have tried to tackle this enormous opportunity. However, all have failed to create an experience that actually takes advantage of the dramatic shift happening to our favorite pastime. Most social television applications have been focused on so-called "gamification", providing check-in systems with badges as rewards for the viewers, and on delivering textual chats and feeds aggregation. In essence, they are trying to create a game around an emotional experience, forgetting that the emotion is actually coming already from the television. On the other side, they are forcing users to type on a keyboard to interact with the rest of the world, losing focus of what they are watching on television (taking away from the pleasure of actually watching television). Lastly, they are engaging the audience as a whole, not considering that people like to watch television with friends, rather than a million of strangers.

SUMMARY OF THE INVENTION

Thus, a general purpose of the present invention is to provide a shared, social viewing experience between sites that are geographically remote from one another.

This is achieved in the present invention by providing a system that selectively manages program display system services involving display devices located at geographically remote locations relative to one another. The system includes a display device, located at each of a plurality of sites, that is capable of receiving and displaying a transmitted show. A control device, also located at each of the plurality of sites, enables managed control of the display device through the execution of a client application. A cloud service interacts with the client applications as executed by the control devices to manage select associations of the plurality of sites.

An advantage of the present invention is that, by operation of the cloud service and local system controller, individuals at each site can enjoy a shared, social viewing experience even where the various participating sites are geographically remote from one another.

BRIEF DESCRIPTION OF THE DRAWINGS

FIG. 1 is a general block diagram illustrating a preferred embodiment of the present invention.

DETAILED DESCRIPTION OF THE INVENTION

The present invention provides a system that enables a shared, social viewing experience even where the various participating sites are geographically remote from one another. In the following detailed description of the invention like reference numerals are used to designate like parts depicted in one or more of the figures.

A preferred embodiment of the present invention is implemented as "Tok.Tv", a "Social TV Platform". As implemented in the preferred embodiment, Tok.Tv enables a social amplification of the intimate viewing experience of a typical living room by sharing it with a limited number of friends or people with similar interests. Tok.Tv is ultimately a software application that can be accessed on the "second screen" in front of the TV (i.e. a mobile devices, like a tablet or a smart-phones, or a laptop), or directly on the television itself—for Connected televisions. Tok.Tv allows users to invite people to join a viewing party: sport, television shows, movies, any event can be viewed on television (or any other device which offers this kind of consumption) can be augmented by launching the Tok.Tv application. The application offers a participated experience which recreates—in a digital environment—a real shared viewing experience. In a word, it is like watching television with friends sitting on our couch, even if they are far away.

With Tok.Tv, the user can find out who is actually watching the game or the show and invite people over to its "virtual living room". As it happens in everyday life, you can just invite people you actually know or meet others who live around you and share your interests, and you can also share emotions with them while watching television, talking and augmenting your voice with sounds (like a clap, a boo, a burp . . . ).

Tok.Tv recreates the living room atmosphere and the pleasure of watching television with others even when you are alone. There is no need to text or type, or even to hold a device in your hands. Voice is the key interaction delivering the social experience. Exactly as it would be on the couch in your house.

However, the application also delivers additional content, which is related to the show we are watching. The additional content can vary from statistical real-time information during a baseball game, premium content, polls and anything that could add to the television show. The content can be produced by the broadcaster or can be created by the viewers themselves.

With Tok.Tv users can choose, among the wide television offering, what to view with friends and other people sharing the same interests. They can then talk to them, while watching the show.

The application shows not only highlights stats related to what people are watching, but it also gives the possibility to discover which of our friends are online. Moreover, it allows the user to find the users available to "TOK" who share our interests: they might cheer for our same team, or living nearby, or being of the same sex or age. In a way, it allows us to talk with our real friends, but also to discover new ones.

The "Living Room Host" will choose what she wants to watch, by picking a show on her television (or directly from the second screen, controlling the television). Knowing what the user is watching (because of a deliberate action by the user or by understanding what the user is actually watching), the application will immediately deliver content (stats and more) related to the show to the user, augmenting the content streamed by the television set. The Host will then invite other users to share the experience. Some of the friends will join the TOK and the voice conversation will start. The users will be able to talk to each other while watching television and enjoying insights and statistics offered by the application. The participants in a TOK chat will be able to enhance their experience by sharing the sounds included inside the application (claps, burp, boo, etc.).

Many customizations will be available to the Tok.Tv users. First of all, every user will be allowed to customize its living room in order to make it more comfortable and personal, as they would do in real life. Users will be able to change colors, add furniture or personal items, change the sounds of the room and customize their own look (avatar) adding clothes and more. The user will be able to create a virtual living room to their taste, by choosing or buying clothes and items offered by third parties.

Tok.Tv is not a common shared viewing experience application. Unlike most of the conventional social television applications, Tok.Tv does not offer an aggregation of Twitter, Facebook and in general social stemmed conversations. All the other players in social television field are focused on three main areas:

Deliver premium content—generated by users or brought by television market players—on a second screen, somehow synched with the television show Allow check-in and public textual comments on television shows, sport matches and movies Aggregate Twitter textual conversations and integrate them with chat systems Tok.Tv represents a complete innovation in the social television field. In the market there is no application that offers an intimate viewing experience by recreating the living room context. Users can participate in conversation on Twitter around a show (e.g. using a precise hashtag) or read what has been discussed, but they are not allowed to recreate a personal viewing space. No application in the market allows a user to actually talk to her friends, as they would if they were sitting next on the couch. Text is the only form of interaction. One that forces the user to focus its attention away from the television. Not something you would ever do with a friend sitting next to you.

While most of the other applications are focused on what users are watching, Tok.Tv is focused on "whom are you watching it with". The question Tok.Tv gives answer to is not "Do you want to join the conversations around the show" but "Do you want to watch television with friends, even if you are at home alone?". In order to do this, Tok.Tv is designed to offer an experience, which is as similar as possible to a real life experience.

After launching the application, users will not be forced to hold the device in their hands while watching television. Thanks to the use of technology to eliminate noise in the background and enhance the user voice, the user will be able to simply drop the device on the side, if she wants. The microphone will still be on, allowing friends to ear each other and commenting on what they are watching.

We want users to have the chance to talk and comment about television programs with people they know or whom they share similar interests. While the focus of most of the social television applications and platform is to "open" the viewing experience to the world (seeing what the rest of the world says about what we are watching, thus losing the intimate context which characterized television consumption forever), we want to give users their old experience back. If it is true that being social is about sharing and communication, we want to enhance this sharing experience by offering new television consumption shared with a few trusted people.

Tok.Tv is more than an app: it is a bridge between users and all the other people who do not want to watch television alone. Tok.Tv is the ideal guest on your couch, a connection between users and their friends. Our aim is to allow the user to recreate the experience of inviting friends to its own living room, not to change the television interaction dramatically. We want to offer the old social television experience in a new paradigm, taking advantage of what a connected living room now can offer. It is a new old way to watch television.

Tok.Tv—System Architecture

The Tok.Tv system architecture includes three primary components as depicted in diagram 10 of FIG. 1.

a plurality of Television sets 105A, 105B, and 105C with or without set-top-box, at each participating site;

a plurality of second-screen mobile devices 110A, 110B, and 110C sitting on the lap of the television viewer (tablet, laptop, computer), at each participating site; and a shared cloud service 115, which is controlling the interaction between the participants in the chat.

Actors.

The scenario on which we are facing the synchronization issue includes three actors:

The Television box. For example, the plurality of Television sets 105A, 105B, and 105C.

The second-screen mobile device sitting on the lap of the TV viewer (tablet, laptop, computer). For example the plurality of second-screen mobile devices 110A, 110B, and 110C.

A cloud service, which is controlling the interaction between the participants in the chat. For example, the shared cloud service 115.

The scenario is depicted in FIG. 1.

The scenario might also include a set-top-box, which is a device attached to the TV set, which could interact directly to the second screen. This scenario is quite common, in particular with older not-connected TV sets: the set-top-box is the device connected to the network, delivering the content to the TV set based on instructions coming from the second screen.

An additional case is the absence of the second screen device, where the application is installed directly on the TV set or on the set-top-box. In this case, the cloud service would be interacting directly with the TV set or the set-top-box.

Steps to solving the delay issue. There are three steps necessary to solve the delay issue:
  Understanding the delay between the various televisions, in order to know which TV is ahead of which and by how many milliseconds
  Fixing the delay, synchronizing all the TV to show the same picture at the same time. We will address the two steps in sequence.
  Understanding the delay between the TV sets. We envision two different methods to understand the delay between the various TV sets:
  Using audio fingerprinting.
  Using video fingerprinting.
  Using APIs offered by the set-top-box or the connected TV.
  A fourth method will include the combination of some of the methods above, depending on the capabilities of the devices used by the users.
  Audio Fingerprinting.

This method assumes the ability of the second screen device to listen to the audio coming from the TV. Starting from a command coming from the cloud service, to which all the second screens are connected (triggered by the user or automatically by the system), all the second screens will record a few seconds of audio of the show that is being presented on TV. The second screens will then send the audio segment to the cloud service, which will confront the segments and compute the delay of every segment compared to the others. The algorithm will use fingerprinting technologies to align the various segments and derive the order of those. The cloud service might already have the full recording of the show, or be recording it live. This would allow a more precise analysis of the delays, for example to determine if one of the TV is actually tuned on a different show. The result of the computation, in a case where three users are watching a single show (User 1, User 2, User 3) would be as follows:
  User 1: delay of 500 milliseconds.
  User 2: delay of 0 milliseconds (the user "ahead" of everyone else).
  User 3: delay of 4500 milliseconds (the user with the largest delay, or "last").
  Video Fingerprinting.

This method assumes the ability of the second screen device to record the video on the TV, through an external camera. Starting from a command coming from the cloud service, to which all the second screens are connected (triggered by the user or automatically by the system), the users will be alerted to point the camera of the device towards the television. The second screens will record a few seconds of video of the show that is being presented on TV. The second screens will then send the video segment to the cloud service, which will confront the segments and compute the delay of every segment compared to the others. The algorithm will use fingerprinting technologies to align the various segments and derive the order of those. The cloud service might already have the full recording of the show, or be recording it live. This would allow a more precise analysis of the delays, for example to determine if one of the TV is actually tuned on a different show. The result of the computation, in a case where three users are watching a single show (User 1, User 2, User 3) would be as follows:
  User 1: delay of 500 milliseconds.
  User 2: delay of 0 milliseconds (the user "ahead" of everyone else).
  User 3: delay of 4500 milliseconds (the user with the largest delay, or "last").
  Use of TV or Set-Top-Box APIs.

This scenario assumes the capability of all of the TVs (or set-top-boxes) to provide an API available on the network of the second screen, providing a timestamp for the show. Starting from a command coming from the cloud service, to which all the second screens are connected (triggered by the user or automatically by the system), all the second screens will query their TVs (or set-top-boxes) and retrieve the timestamp of the show. The timestamps will then be sent to the cloud service to be analyzed. For example, in case of three users watching a single show (User 1, User 2, User 3):
  User 1: timestamp of 1,500 milliseconds from the beginning of the show.
  User 2: timestamp of 1,000 milliseconds from the beginning of the show.
  User 3: timestamp of 5,500 milliseconds from the beginning of the show.

The cloud service will then compute the delay, comparing the timestamps, thus arriving at the following conclusion in our example:
  User 1: delay of 500 milliseconds.
  User 2: delay of 0 milliseconds (the user "ahead" of everyone else).
  User 3: delay of 4500 milliseconds (the user with the largest delay, or "last").
  A combination of different methods.

A final method involves the use of a combination of the three methods explained above. This method could be useful in situations where some of the second screen devices are not capable of recording audio from the TV sets, or some of the devices are not capable of recording video from the TV set, or some of the TV sets are not capable of providing a timestamp. In such case, a combination of timestamp and audio/video fingerprinting will be performed at the cloud service level, to extract the delay—as in the three methods described before.

Fixing the Delay.

Once the cloud service has determined the delay of each TV sets, the next step is to pause the TV sets which are ahead of the others, to align the show to the TV set which is "last". This method assumes that the TV sets can be paused, due to the availability of a pause button on the remote control, device or set-top-box, via user intervention or API. The cloud service will send to each second screen device a command to pause for the amount of time necessary to align all TV sets to the "last" user. In our example:
  User 1 is 4,000 milliseconds ahead of User 3
  User 2 is 4,500 milliseconds ahead of User 3
  User 3 is the "last" user
  Therefore, the cloud service will instruct the second screen of User 1 to pause the TV for 4 seconds and the second screen of User 2 to pause the TV for 4.5 seconds. At the end of the operation, all TVs will be in sync. The success of the operation can be verified by re-doing the delay analysis explained before: after a sync is performed, all the TVs should have delay equal to zero. The second screen could manage to pause the TV sets (or set-top-boxes) in two ways:

Via an API call to the TV set (or set-top-box).

Visualizing a message on screen to instruct the user to manually pause the TV set for a determined amount of time (for example, visualizing a countdown).

Handling drifts during a show. Once a synchronization of all the devices is completed, there is still the possibility that—during the show—the TV sets will get "out-of-sync". This scenario forces a resync of the devices, to make sure all the shows are aligned. The re-sync will be trigger by:

A scheduled check by the cloud service, based on a time interval which will be computed by the cloud sync (the time between checks will be doubled compared to the previous check, if at the previous check the TVs are all in sync, and reset to the minimum after a check which shows that the TVs are not in sync)

A user command, if one of the users realizes that the show she is watching is out of sync with the one the other users are watching.

The check to understand if the different TV sets are still in sync or not is going to be performed using one of the methods described in section 3.1. Ideally the check will be completely transparent for the user; therefore excluding the video fingerprinting option.

Remotely command multiple TVs.

Once the TVs are in sync, one of the user (the "owner of the living room" or host: the user who invited all the other users to watch the show with her) will be able to control the TV sets of all the other users. The following scenarios are expected:

The host pauses the show, the show on the other TV sets is paused as well.

The host forward or rewinds the show, the show on the other TV sets are forwarded or rewound as well.

The host plays the show again, the show starts again on the other

TV sets.

The method used to remotely command the other TV set is similar to Use of TV or Set-Top-Box APIs described above. This scenario assumes the capability of all of the TVs (or set-top-boxes) to provide an API available on the network of the second screen, providing the ability for a device to pause, play, forward or rewind the TV. The second screen of the host, after the host acts on the device to pause/rewind/forward/play the show, will communicate to the cloud service, which will issue the same command to the other devices. Because of network delays, there is the possibility that the TV sets will get out-of-sync during the procedure. To solve this problem, after every command the procedure to synchronize all the TVs will be triggered (using the set-top-box APIs).

This preferred embodiment is depicted FIG. 1.

The architecture may also include a set-top-box, a device attached to the television set, which could interact directly to the second screen. This scenario is quite common, in particular with older not-connected television sets: the set-top-box is the device connected to the network, delivering the content to the television set based on instructions coming from the second screen.

An additional case is the absence of the second screen device, where the application is installed directly on the television set or on the set-top-box. In this case, the cloud service would be interacting directly with the television set or the set-top-box.

The Television box could be our old analog television, or a more modern digital or HD television, but also a computer or mobile device capable to show live or recorded video. In many cases, a set-top-box is actually the device delivering the content to the television, and capable of interacting with the rest of the network (in particular, with the second-screen application). The television or the set-of-box can be capable of DVR (Digital Video Recording). In this case, the show can be paused and restarted through the use of a remote control or through remote APIs (for example, from the second screen device). The ability to remotely control the show is the basis of the Tok.Tv ability to synchronize all the shows for all the users of the application, eliminating the risk of delays between the audio of the users, which could potentially ruin the experience to the users.

The second screen device is a control device preferably in close reach of the television viewer. It can be a tablet, such as an iPad, or a laptop computer. The Tok.Tv application runs on the device, provides additional data to the television viewer (synchronized with the television show) and—if possible—synchronizes the shows for all the viewers connected in a Tok.Tv voice chat.

The device is connected to the network over wireless connection (e.g. Wi-Fi) or wired connection (e.g. Ethernet). It interacts with the cloud service to receive the content that enhances the television experience (synchronized with the television show), it provides the voice interaction with the other Tok.Tv users connected to the same virtual living room, and it controls the user television to synchronize it with the show of the other users (based on commands received by the cloud service). The second screen device needs a network connection capable of transmitting one audio stream (4 KB per second) plus the additional content and control signals coming from the cloud service (an additional 1-4 KB per second).

Alternatively, the Tok.Tv application can be installed directly on the television set or on the set-top-box. In this case, the cloud service would be interacting directly with the television set or the set-top-box.

The cloud service operates to control the interaction between the participants in the chat. The cloud server preferably consists of a series of servers, which provide system-wide services, such as:

authenticate the users and allow new users to sign-up for the Tok.Tv service parsing the additional content received by third party feeds, and deliver it to the connected clients provide capabilities to manage friends of users, also importing them from external social networks provide presence of users to friends, so that a user will be able to know which of her friends are watching the same show she is watching multiplex the audio channels coming from different users in a chat (optional, it could be done by a single second screen device in a peer-to-peer modality)

synchronize the television show between different users, by receiving audio or video of the show currently watched by each user in a chat, determining the delay between them, and command the individual clients to pause their televisions accordingly providing a marketplace for virtual goods, such as additional noises, virtual furniture for the user living room and clothing for the user avatar serving ads to the clients, optionally synchronized with the television ads Thus, the present invention provides a cloud service and a locally executed application that enables individuals at each site to enjoy a shared, social viewing experience even where the various participating sites are geographically remote from one another.

In view of the above description of the preferred embodiments of the present invention, many modifications and variations of the disclosed embodiments will be readily appreciated by those of skill in the art. It is therefore to be understood that, within the scope of the appended claims, the invention may be practiced otherwise than as specifically described above.

The invention claimed is:

1. A system providing for management of program display system services, said system comprising:
   a plurality of display devices located at geographically remote sites relative to one another;
   a display device at each respective one of a plurality of sites receiving and displaying a transmitted show;
   a control device at each respective one of said plurality of sites, said control device comprising a processor executing instructions stored in memory, said instructions operative for controlling said display device and further operative to execute a client application;
   a plurality of cloud servers providing a cloud service; said cloud service operative to interact with said client applications as executed by said instructions of said control devices to cause each of said display devices at each of said plurality of sites to display said transmitted show synchronized on each of said display devices at each of said plurality of sites, said cloud service re-synchronizing said transmitted show on each of said display devices at each of said plurality of sites by scheduled checks based on a computed time interval with said computed time interval between said scheduled checks being doubled compared to a previous check if at said previous check said transmitted show is synchronized on each of said display devices at each of said plurality of sites and said scheduled checks being set to a minimum if at said previous check said transmitted show is not synchronized on each of said display devices at each of said plurality of sites, said re-synchronizing of said transmitted show using a combination of audio fingerprinting, video fingerprinting, and application programming interfaces to re-synchronize said transmitted show, said application programming interfaces being available on said display devices at each of said plurality of sites; and
   an auxiliary display device having an application at each respective one of said plurality of sites, said auxiliary display device receiving a command from said cloud service that in response records a few seconds of audio from said transmitted show during a voice conversation and transmits said few seconds of audio to said cloud service that in response computes a delay of said transmitted show compared to auxiliary display devices at other geographically remote sites.

2. The system of claim 1, wherein said cloud service authenticates users and signs-up new users.

3. The system of claim 1, wherein said cloud service parses additional content received by third party feeds and delivers it to connected users.

4. The system of claim 1, wherein said cloud service causes display of user identities.

5. The system of claim 1, wherein said cloud service multiplexes audio channels from a plurality of users into a single communication channel.

6. The system of claim 1, further comprising said auxiliary display device configured to display a virtual living room.

7. The system of claim 6, said virtual living room display further comprising furniture.

8. The system of claim 1, wherein said cloud service serves an advertisement to said auxiliary display device that is synchronized with an advertisement on said transmitted show on said display device.

9. The system of claim 1, further comprising a single party at one of said plurality of sites controlling said display devices at all of said plurality of sites.

10. A method for providing management of program display system services involving display devices located at geographically remote sites relative to one another, said method comprising:
   receiving and displaying a transmitted show on a display device at each respective one of a plurality of sites;
   controlling said display device by a control device at each respective one of said plurality of sites, said control device having a client application;
   interacting with said client applications by a cloud service, using a plurality of cloud servers, to cause each of said display devices at each of said plurality of sites to display said transmitted show synchronized on each of said display devices at each of said plurality of sites, said cloud service re-synchronizing said transmitted show on each of said display devices at each of said plurality of sites by scheduled checks based on a computed time interval with said computed time interval between said scheduled checks being doubled compared to a previous check if at said previous check said transmitted show is synchronized on each of said display devices at each of said plurality of sites and said scheduled checks being set to a minimum if at said previous check said transmitted show is not synchronized on each of said display devices at each of said plurality of sites, said re-synchronizing of said transmitted show using a combination of audio fingerprinting, video fingerprinting, and application programming interfaces to re-synchronize said transmitted show, said application programming interfaces being available on said display devices at each of said plurality of sites; and
   receiving a command from said cloud service on an auxiliary display device having an application at each respective one of said plurality of sites, said command causing said auxiliary display device to record a few seconds of video from said transmitted show during a voice conversation and transmit said few seconds of video to said cloud service that in response computes a delay of said transmitted show compared to auxiliary display devices at other geographically remote sites.

* * * * *